(12) United States Patent
Vrnak et al.

(10) Patent No.: US 6,433,279 B1
(45) Date of Patent: Aug. 13, 2002

(54) FIELD OR FACTORY INSTALLABLE PADLOCK AND SEALING DEVICE

(75) Inventors: Thomas Francis Vrnak, Chapel Hill; Melanie Ann Lewis, Durham; Jeffrey Eric Werner, Haw River, all of NC (US); Rham Adalberto Sandoval Bolio, Monterroy (MX); Michael Baird Davenport, Mehoopany, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,434

(22) Filed: Apr. 4, 2001

(51) Int. Cl.[7] ................................................. H02G 3/14
(52) U.S. Cl. ........................ 174/66; 174/67; 220/241; 220/242
(58) Field of Search .................. 174/66, 67; 220/241, 220/242; D13/177; 292/148

(56) References Cited

U.S. PATENT DOCUMENTS

| | | | | |
|---|---|---|---|---|
| 3,851,225 A | * | 11/1974 | Luchetta | 174/DIG. 2 |
| 4,160,137 A | | 7/1979 | Clement et al. | |
| 4,185,860 A | | 1/1980 | Bondi | |
| 4,832,387 A | | 5/1989 | Guiler | |
| 5,221,814 A | * | 6/1993 | Colbaugh et al. | 174/66 |
| 5,646,371 A | * | 7/1997 | Fabian | 220/3.6 X |
| 6,005,188 A | * | 12/1999 | Teichlor et al. | 174/50 |
| 6,188,022 B1 | * | 2/2001 | He | 174/58 |

* cited by examiner

Primary Examiner—Dean A. Reichard
Assistant Examiner—Dhiru R Patel
(74) Attorney, Agent, or Firm—Cantor Colburn LLP

(57) ABSTRACT

A padlock and seal device for electrical enclosures includes a cover bracket secured to a cover of the electrical enclosure; a corner post bracket secured to a corner post of the electrical enclosure, the corner post bracket aligning with the cover bracket; a first opening disposed in the cover bracket; and a second opening in the corner post bracket, the second opening aligning with the first opening.

24 Claims, 6 Drawing Sheets

FIELD OR FACTORY INSTALLABLE PADLOCK AND SEALING DEVICE

BACKGROUND OF INVENTION

Electrical enclosures, and in particular, switchboards are used in electrical distribution systems for the mounting of various electrical distribution components. Such components may include switches, protective devices (e.g., circuit breakers), and instruments. These components are mounted to a plurality of mounting rails within the switchboard and receive electrical power via buses that extend within the switchboard.

A switchboard includes a large single panel, frame, or assembly of panels having the electrical components mounted on the face panel or back panel or both. Switchboards may be accessible from the rear, the front, or the sides. The face panel of a switchboard may include a cover. The cover may be mounted to the switchboard at the frame by a hinge on one side of the cover, or by four screws, one at each corner of the cover.

SUMMARY OF INVENTION

The above discussed and other drawbacks and deficiencies of the prior art are overcome or alleviated by a padlock and seal device for electrical enclosures. In an exemplary embodiment of the invention, a padlock and seal device includes a cover bracket secured to a cover of the electrical enclosure; a corner post bracket secured to a corner post of the electrical enclosure, the corner post bracket aligning with the cover bracket; a first opening disposed in the cover bracket; and a second opening in the corner post bracket, the second opening aligning with the first opening.

BRIEF DESCRIPTION OF DRAWINGS

Referring to the exemplary drawings wherein like elements are numbered alike in the several Figures.

DETAILED DESCRIPTION

Figure 1:
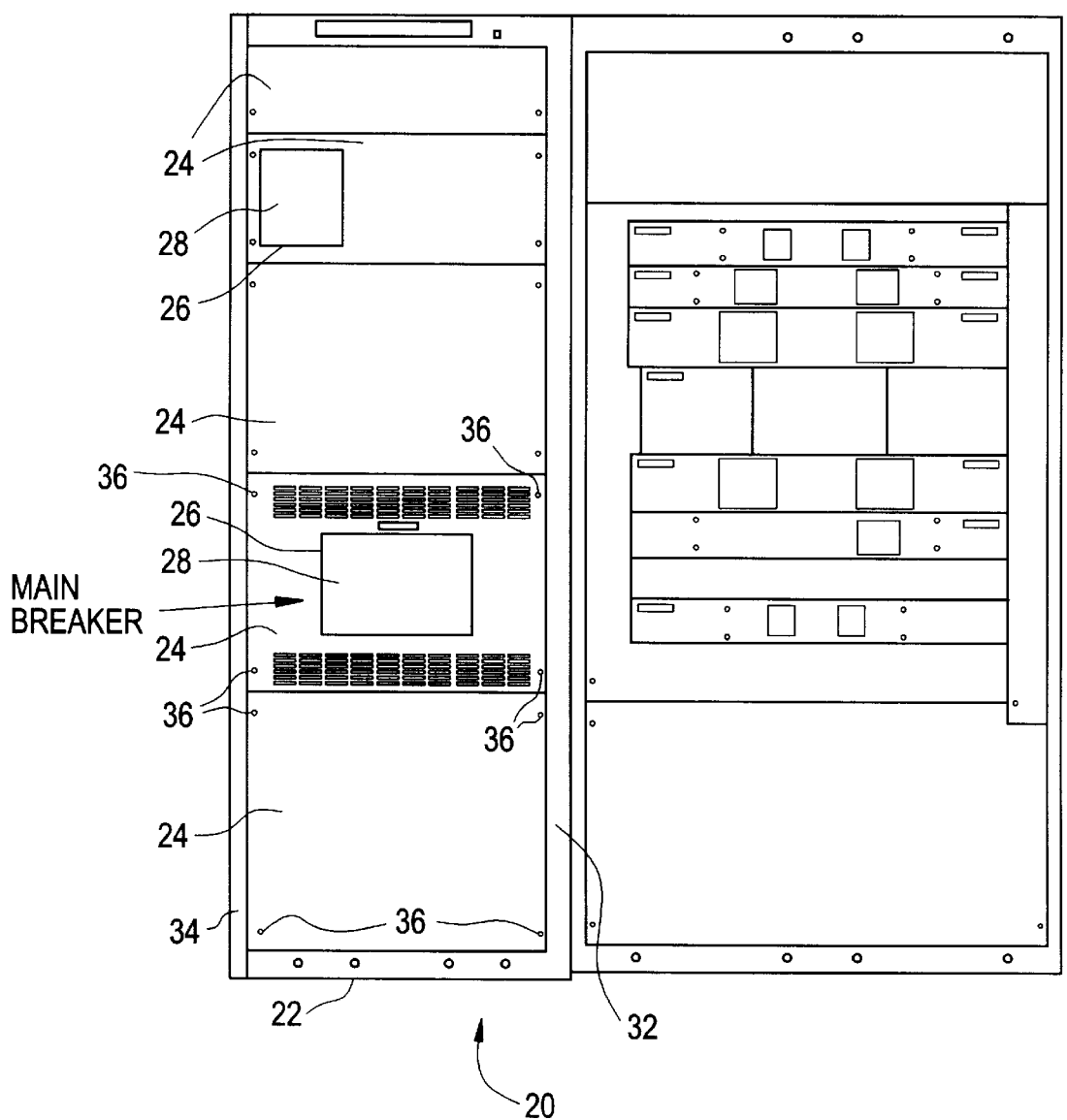
FIG. 1 is a front view of an electrical enclosure with a closed cover.
Figure 2:
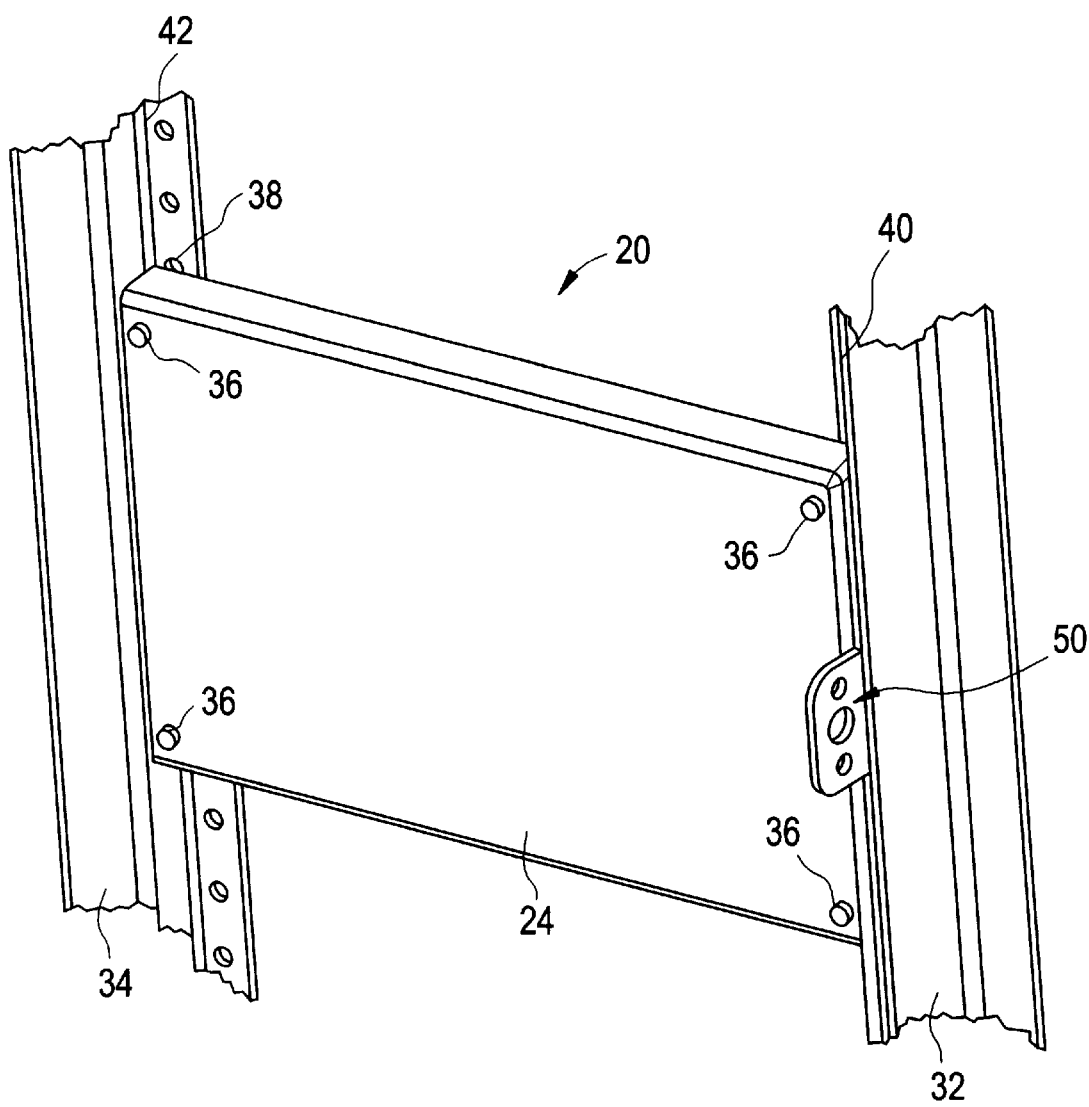
FIG. 2 is a front view of a portion of an electrical enclosure with a closed cover.

Referring to FIG. 1 and FIG. 2, a front view of an electrical enclosure 20 is illustrated. Electrical enclosure 20 comprises a frame 22 and a cover 24. While FIG. 1 illustrates a number of covers 24, electrical enclosure may comprise either one cover or a plurality of covers. Some covers 24 include apertures 26 for electrical components 28, such as electrical cutoff devices. Frame 30 comprises corner posts 32 and 34 located at either side of cover 24. Corner posts 32 and 34 are used to mount and secure cover 24 to frame 22. Cover 24 is employed to protect electrical wires and other electrical devices disposed under cover 24.

When cover 24 is in contact with corner posts 32 and 34, cover 24 is in the closed position. Cover 24 is configured in a single plane and may be releasably secured to electrical enclosure 20 at corner post 32 and corner post 34 by fasteners 36 such as screws, bolts, rivets or the like (not shown) disposed through holes 38. Fasteners 36 may also include snap-fit clips or quarter-turn latches. Holes 38 are located at a recess 40 at corner post 32 and at a recess 42 at corner post 34. Recesses 40 and 42 have an L shape and allows cover 24 to be positioned flush with corner posts 32 and 34 when cover 24 is in the closed position. It will be recognized by one skilled in the art that electrical enclosure 20 may be any type of electrical enclosure so long as cover 24 fits within recesses 40 and 42 of corner posts 32 and 34, respectively, of electrical enclosure 20.

Figure 3:
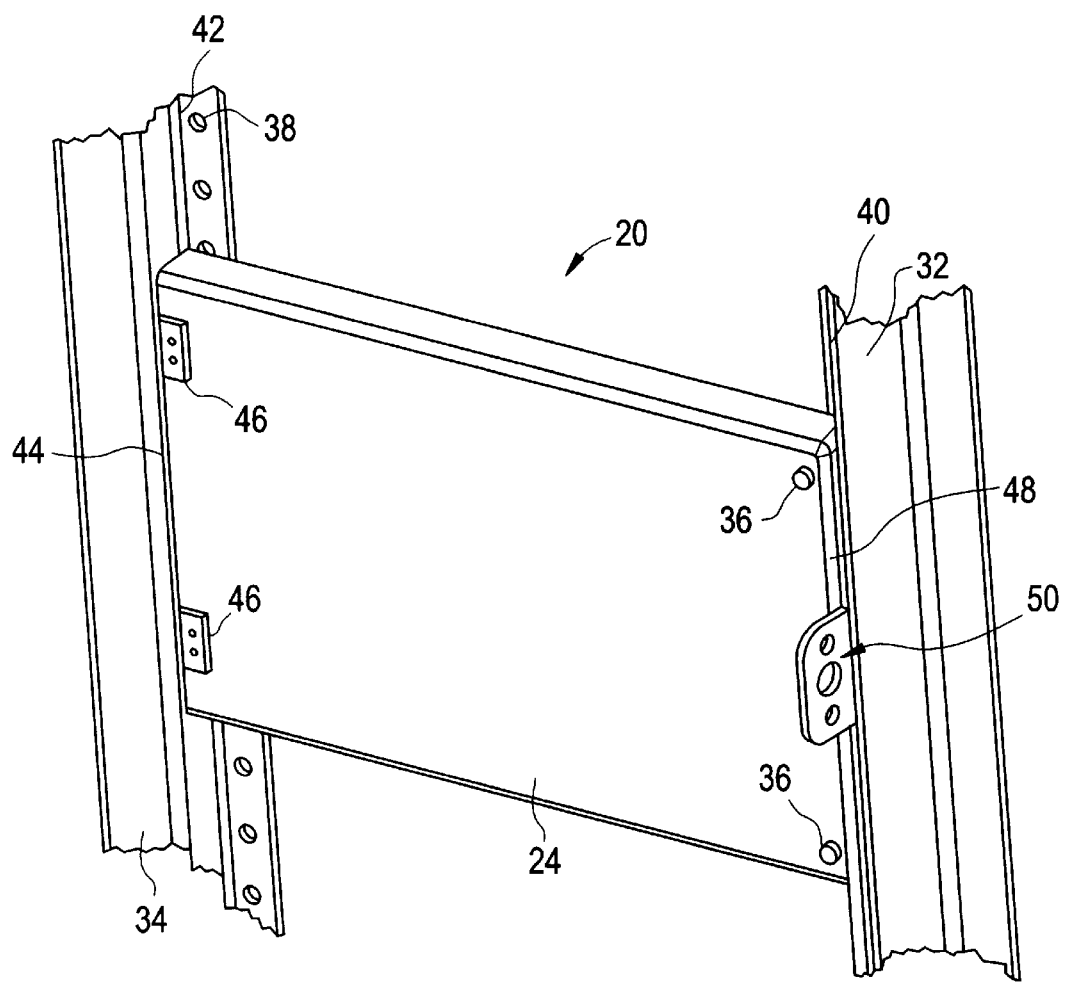
FIG. 3 is an alternative embodiment of a front view of an electrical enclosure with a closed cover.

Referring to FIG. 3, an alternative embodiment of electrical enclosure 20 is depicted. In this embodiment, an end 44 of cover 24 is hingedly secured to corner post 34 by a hinge 46, which may include more than one hinge. An opposing end 48 of cover 24 is releasably secured to corner post 32 using fasteners 36 such as screws, bolts, latches, or snap-fit clips. For example, fasteners 36 may include a quarter-turn latch, the design of which is known in the art. Cover 24 can be opened by releasing fastener 36, pulling opposing end 48 away from corner post 34, and pivoting cover 24 about its hinge 46. While this embodiment illustrates hinge 46 to corner post 34, and fastener 36 to corner post 32, one skilled in the art will appreciate that hinge 46 may be hingedly secured to corner post 32 and fastener 36 may be releasably secured to corner post 34.

Referring to FIGS. 2 and 3, a padlock and seal device 50 disposed at a cover 24 is illustrated. In particular, FIGS. 2 and 3 illustrate padlock and seal device 50 disposed at a cover 24 in the closed position relative to electrical enclosure 20. One skilled in the art will appreciate that while padlock and seal device 50 is illustrated as being disposed at corner post 32, padlock and seal device 50 may be disposed at corner post 34 or at both corner posts 32 and 34, depending on orientation of cover 24 and the manner in which cover 24 opens.

Figure 4:
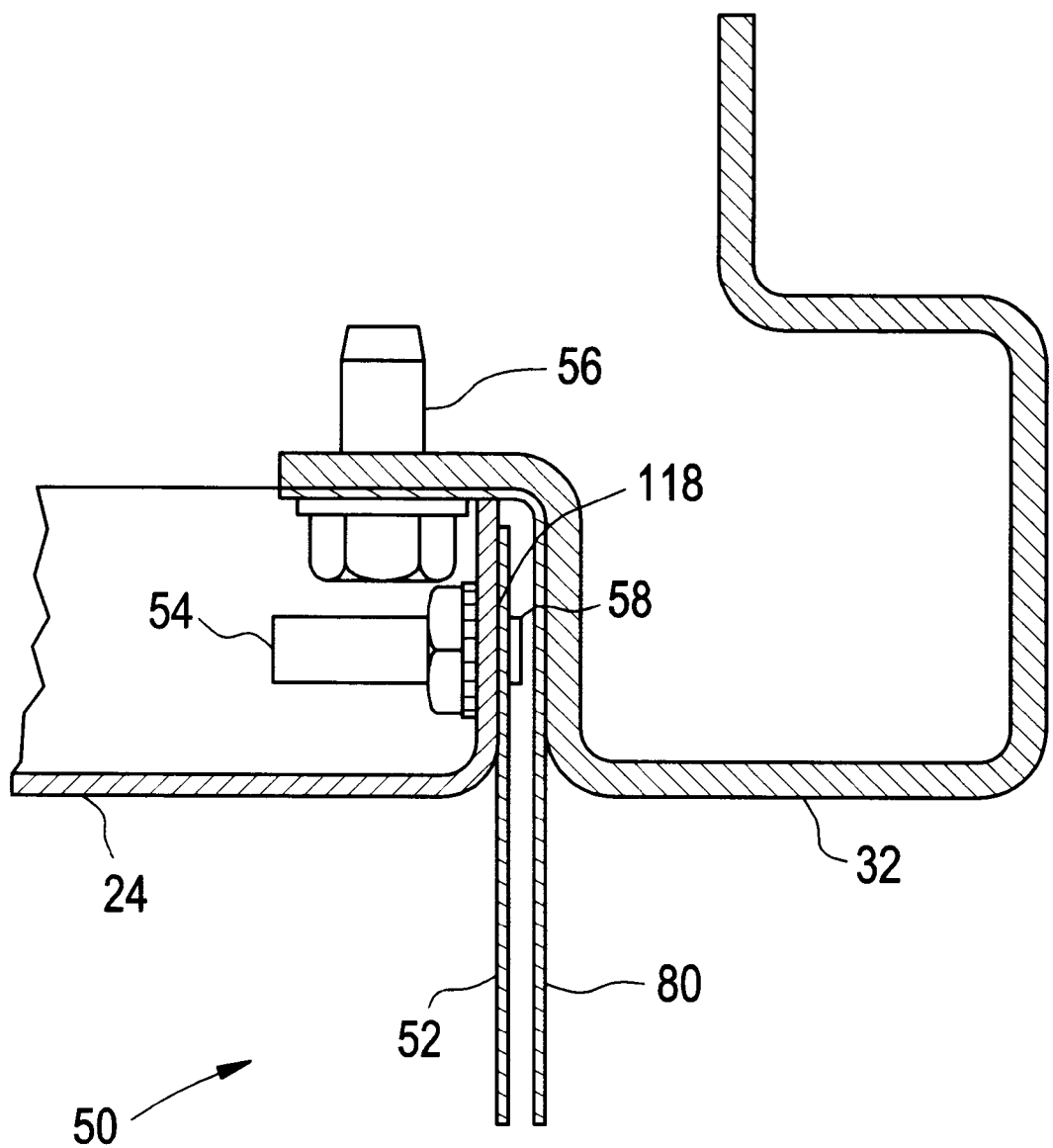
FIG. 4 is a top view of an electrical enclosure illustrating the padlock and seal device.

FIG. 4 is a top view of electrical enclosure 20, which details padlock and seal device 50. Padlock and seal device 50 includes a cover bracket 52 secured cover 24 by a fastener 54, which may include more then one fastener. Padlock and seal device 50 also includes a corner post bracket 80 secured to corner post 32 by a fastener 56, which may include more than one fastener. Fastener 54 preferably has a flat head 58 so that cover 24 can be closed without interfering with corner post 32. Otherwise, fasteners 54 and 56 may be screws, bolts, to any type of fastener that can secure a bracket to cover 24 or corner post 32 In addition, fastener 54 and fastener 56 should be sized so as not to interfere with each other when located as shown on FIG. 4.

Figure 5:
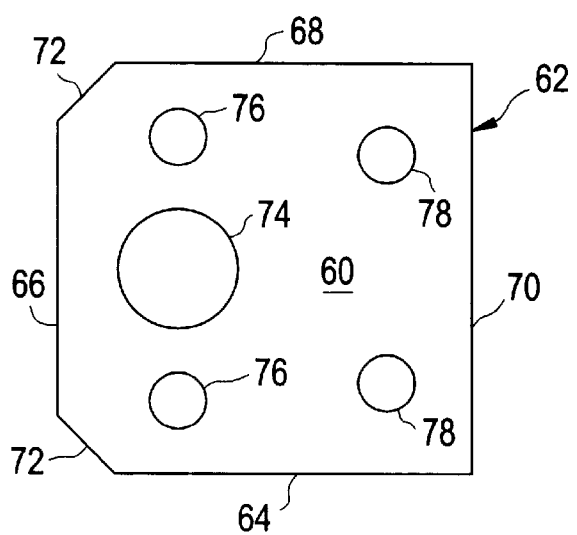
FIG. 5 is a top view of the cover bracket of the padlock and seal device.

FIG. 5 depicts cover bracket 52. Cover bracket 52 is preferably a flat plate 60, which has a periphery 62 defined by a first side 64, a second side 66, a third side 68, and a fourth side 70. First side 64 and third side 68 are preferably generally straight and parallel to each other. Second side 66 and fourth side 70 are preferably generally straight and parallel to each other; however, second side 66 may also include rounded or slanted corners 72. Cover bracket 52 includes a padlock opening 74, which is contained fully within periphery 62 of flat plate 60. Padlock opening 74 may be round and is large enough to receive a padlock assembly, (not shown) which may be preferably about 0.5 inches in diameter.

Cover bracket 52 may also include seal openings 76. Seal openings 76 are contained fully within periphery 62 of flat plate 60, and may be adjacent to padlock opening 74. Seal openings 76 may be round and is large enough to receive a sealing assembly (not shown), which may be preferably about 0.25 inches in diameter. In the preferred embodiment, there are two seal openings 76, which are located adjacent to padlock opening 74 and seal openings 76 are located on either side of padlock opening 74. In addition, seal openings 76 and padlock opening 74 are generally aligned so that they are parallel to second side 66 and fourth side 70, and located adjacent to second side 66.

Seal openings 76 may receive a seal assembly (not shown) or the like, which may be extended through seal openings 76. Seal assembly (not shown) is sealed in a manner that constitutes a tamper resistant means to prevent unauthorized persons from opening cover 24 without breaking seal assembly (not shown). If seal assembly (not shown) is broken, it indicates that electrical enclosure 20 has been accessed.

Cover bracket 52 also includes an attachment opening 78. Attachment opening 78 is contained fully within periphery 62 of flat plate 60 and may be round.

Attachment opening 78 is large enough to receive fastener 54 (not shown on FIG. 4) and may be preferably about 0.22 inches in diameter. In the preferred embodiment, there are two attachment openings 78, which are generally aligned so that they are parallel to second side 66 and fourth side 70 and are located adjacent to fourth side 70.

Figure 6:
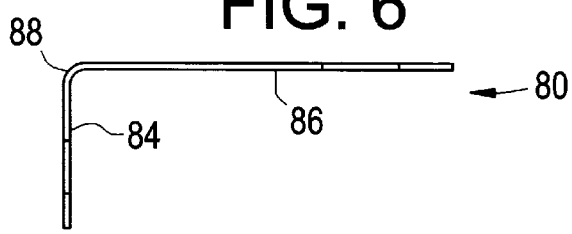
FIG. 6 is a side view of the corner post bracket of the padlock and seal device.
Figure 7:
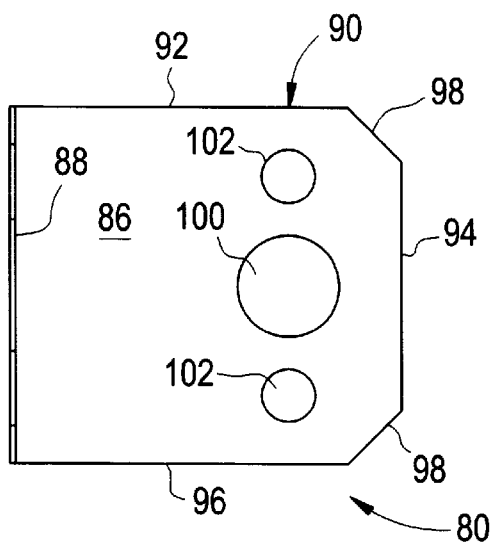
FIG. 7 is top view of the corner post bracket of the padlock and seal device.

FIG. 6 depicts a side view of corner post bracket 80. Corner post bracket 80 includes a first portion 84 and a second portion 86 extending from a first side 88. Second portion 86 is generally perpendicular from first portion 84. Referring to FIG. 7, second portion 86 has a periphery 90 defined by first side 88, a second side 92, a third side 94, and a fourth side 96. First side 88 and third side 94 are preferably generally straight and parallel to each other. Second side 92 and fourth side 96 are preferably generally straight and parallel to each other; however, third side 94 may also include rounded or slanted corners 98. Second portion 86 includes a padlock opening 100, which is contained fully within periphery 90 of second portion 86. Padlock opening 100 may be round and is large enough to receive a padlock assembly, (not shown) which may be preferably about 0.5 inches in diameter.

Second portion 86 may also include a seal opening 102. Seal openings 102 are contained fully within periphery 90 of second portion 86, and may be adjacent to padlock opening 100. Seal openings 102 may be round and are large enough to receive a sealing assembly (not shown), which may be preferably about 0.25 inches in diameter. In the preferred embodiment, there are two seal openings 102, which are located adjacent to padlock opening 100 and each seal opening 102 is located on either side of padlock opening 100. In addition, seal openings 102 and padlock opening 100 are generally aligned so that they are parallel to first side 88 and third side 94, and located adjacent to third side 94.

Figure 8:
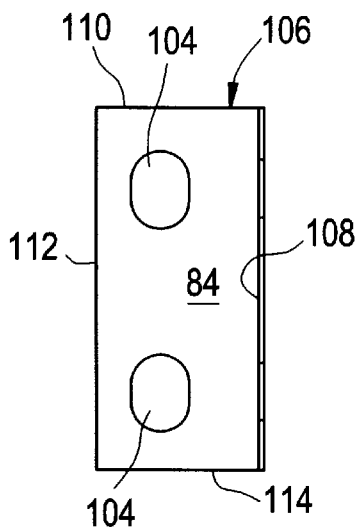
FIG. 8 is a side view of the corner post bracket of the padlock and seal device.

Referring to FIG. 8, first portion 84 includes an attachment opening 104. Attachment opening 104 is contained fully within a periphery 106 of first portion 84 and may be oval. First portion 84 has periphery 106 defined by a first side 108, a second side 110, a third side 12, and a fourth side 114. First side 108 and third side 112 are preferably generally straight and parallel to each other. Second side 110 and fourth side 114 are preferably generally straight and parallel to each other. Attachment opening 104 is large enough to receive fastener 56 (shown in FIG. 4) and may be preferably about 0.28 inches by about 0.375 inches. In the preferred embodiment, there are two attachment openings 164, which are generally aligned so that they are parallel to first side 108 and third side 112.

Figure 9:
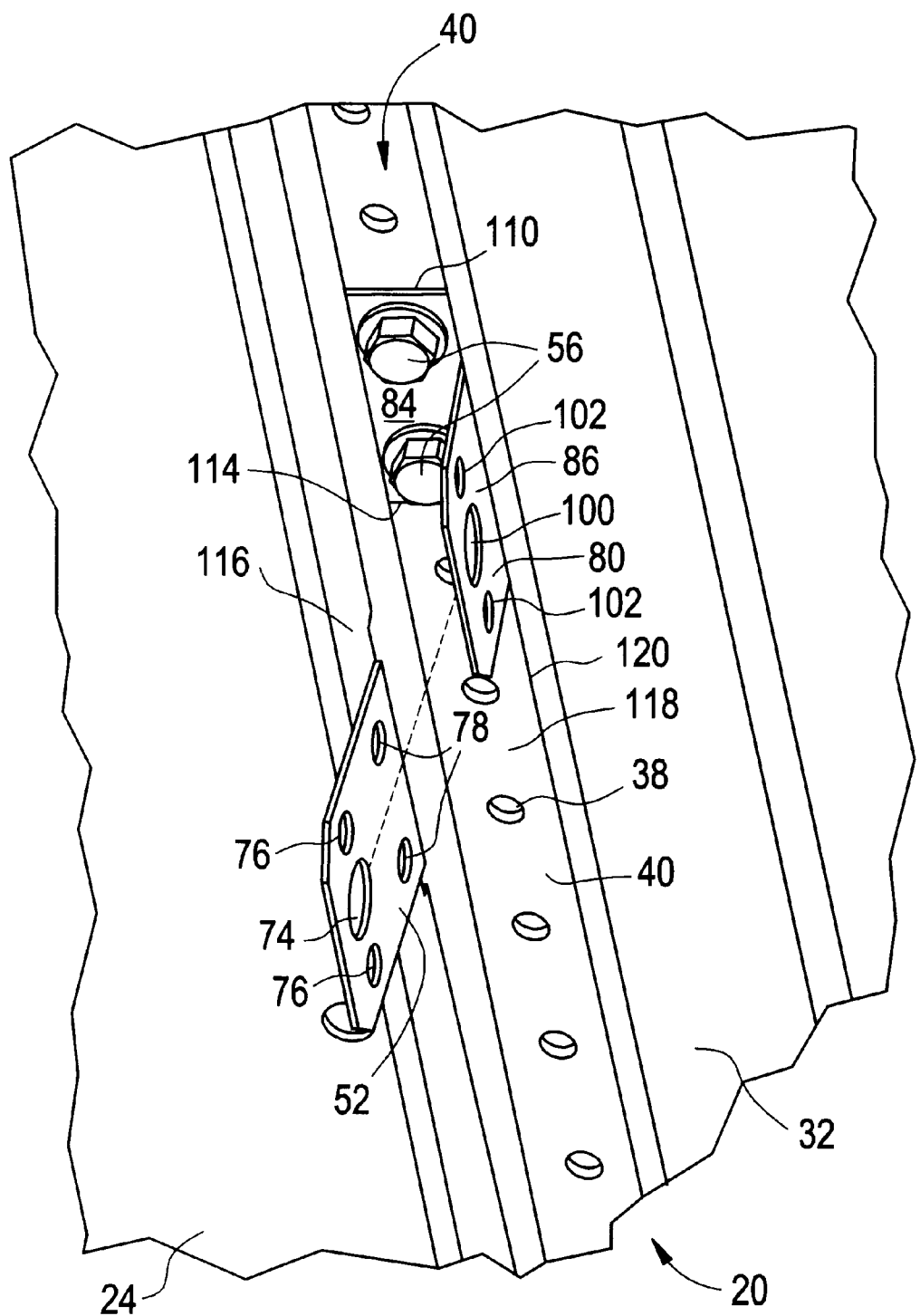
FIG. 9 is a front view of an open cover shown relative to a corner post.

Referring to FIG. 9, cover bracket 52 is shown secured to an edge 116 of cover 24 and corner post bracket 80 is shown secured to corner post 32 at recess 40. Cover 24 may be equipped with holes (not shown) to receive fasteners 54 or such holes may be drilled into cover 24 at the time cover bracket 52 is secured to cover 24. Holes 38 are disposed at corner post 32 and may be used to secure corner post bracket 80.

Corner post bracket 80, which is shaped like an L, fits within recess 40. Recess 40 is also shaped like an L with a first side 118 and a second side 120. Preferably, the length of second side 110 and fourth side 114 of first portion 84 are the same size as first side 118 of recess 40. Preferably, second portion 86 is the same size as cover bracket 52. Moreover, padlock opening 74 should more or less align with padlock opening 100 when cover 24 is in the closed position so that a padlock assembly (not shown) may be passed through padlock opening 74 and padlock opening 100. However, it is not critical that padlock opening 74 align perfectly with padlock opening 100. The same is true for seal openings 76 and seal openings 102. Seal openings 76 and seal openings 102 should more or less align when cover 24 is in the closed position so as to be able to receive a seal assembly. See also FIG. 1, which demonstrates padlock and seal device 50 when cover 24 is in the closed position relative to electrical enclosure 20.

Padlock and seal device 50 provide for a manner of securing electrical enclosures and in particular, switchboards. If electrical enclosure 20 is not locked, it is possible for unauthorized personnel to open cover 24 and tamper with the electrical distribution components within the electrical enclosure 20. The padlock and seal device allows existing electrical enclosures to be modified to allow the enclosures to be sealed, without designing a new cover. Moreover, because the enclosure is locked, electrical companies can monitor if enclosures have been broken into and if someone has tampered with the switchboard.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A padlock and seal device for electrical enclosures, said padlock and seal device comprising:

a cover bracket secured to a cover of said electrical enclosure;

a corner post bracket secured to a corner post of said electrical enclosure, said corner post bracket aligning with said cover bracket;

a first opening disposed in said cover bracket; and a second opening in said corner post bracket, said second opening aligning with said first opening.

2. The padlock and seal device of claim 1, wherein said first opening and said second opening are first padlock openings, said first padlock openings sized to receive a padlock assembly.

3. The padlock and seal device of claim 1, wherein said first opening and said second opening are first seal openings, said first seal openings sized to receive a seal assembly.

4. The padlock and seal device of claim 2, further comprising a third opening in said cover bracket and a fourth opening in said corner post bracket, said third opening aligning with said fourth opening, said third opening and said fourth opening are second seal openings, said second seal openings sized so as to receive a seal assembly.

5. The padlock and seal device of claim 4, wherein one of said second seal openings is adjacent to one of said first padlock openings.

6. The padlock and seal device of claim 3, further comprising a third opening in said cover bracket and a fourth opening in said corner post bracket, said third opening aligning with said fourth opening, said third opening and said fourth opening are second padlock openings, said second padlock openings sized so as to receive a padlock assembly.

7. The padlock and seal device of claim 6, wherein one of said first seal openings is adjacent to one of said second padlock openings.

8. The padlock and seal device of claim 1, wherein said cover bracket is secured to said cover by a fastener with a flat head.

9. The padlock and seal device of claim 1, wherein said corner post bracket is secured to said corner post by a fastener.

10. An electrical enclosure for electrical distribution components, said enclosure comprising:

a frame comprising a corner post having an L-shaped recess;

a cover mounted to said frame and disposed at said L-shaped recess;

a cover bracket secured to said cover;

a corner post bracket including a first portion and a second portion extending generally perpendicular from said first portion, said corner bracket secured to said L-shaped recess at said corner post;

a first opening disposed in said cover bracket; and a second opening in said corner post bracket, said second opening aligning with said first opening.

11. The electrical enclosure of claim 10, wherein said cover is hingedly secured to said frame.

12. The electrical enclosure of claim 10, wherein said cover is releasably secured to said frame.

13. The electrical enclosure of claim 10, further comprising a third opening in said cover bracket and a fourth opening in said corner post bracket, said third opening aligning with said fourth opening.

14. The electrical enclosure of claim 10, wherein said cover bracket is proximate to an edge of said cover.

15. The electrical enclosure of claim 10, wherein said cover bracket is generally parallel to said first portion of said corner post bracket.

16. The electrical enclosure of claim 10, wherein said cover bracket is secured to said cover by a fastener with a flat head.

17. The electrical enclosure of claim 10, wherein said corner post bracket is secured to said corner post by a fastener.

18. An electrical enclosure for electrical distribution components, said enclosure comprising:

a frame comprising a corner post having an L-shaped recess;

a cover mounted to said frame and disposed at said L-shaped recess;

a first bracket secured at said cover;

a second bracket secured at said frame and adjacent to said first bracket; and means for locking said electrical enclosure at said first bracket and said second bracket.

19. An electrical enclosure for electrical distribution components, said enclosure comprising:

a frame comprising a corner post having an L-shaped recess;

a cover mounted to said frame and disposed at said L-shaped recess;

a corner post bracket including a first portion and a second portion extending generally perpendicular from said first portion, said corner bracket secured to said L-shaped recess at said corner post;

a cover bracket secured to said cover proximate to an edge of said cover, said cover bracket is generally parallel to said first portion of said corner post bracket;

a first opening disposed in said cover bracket; and a second opening in said corner post bracket, said second opening aligning with said first opening.

20. The electrical enclosure of claim 19, wherein said cover bracket is secured to said cover by a fastener with a flat head.

21. The electrical enclosure of claim 19, wherein said corner post bracket is secured to said corner post by a fastener.

22. The electrical enclosure of claim 19, wherein said cover is hingedly secured to said frame.

23. The electrical enclosure of claim 19, wherein said cover is releasably secured to said frame.

24. The electrical enclosure of claim 19, further comprising a third opening in said cover bracket and a fourth opening in said corner post bracket, said third opening aligning with said fourth opening.

* * * * *